(12) United States Patent
Sclare (10) Patent No.: US 9,637,153 B2
(45) Date of Patent: May 2, 2017

(54) CHILD-CARRIER MOUNTING ADAPTER

(71) Applicant: KIDS II, INC., Atlanta, GA (US)

(72) Inventor: Jacob Sclare, Dacula, GA (US)

(73) Assignee: KIDS II, INC., Atlanta, GA (US)

( * ) Notice: Subject to any disclaimer, the term of this patent is extended or adjusted under 35 U.S.C. 154(b) by 0 days.

(21) Appl. No.: 14/489,603

(22) Filed: Sep. 18, 2014

(65) Prior Publication Data

US 2015/0076774 A1    Mar. 19, 2015

(51) Int. Cl.
  *B62B 7/14*   (2006.01)
  *B62B 9/12*   (2006.01)
  *B62B 9/28*   (2006.01)
  *B62B 5/00*   (2006.01)

(52) U.S. Cl.
  CPC .......... *B62B 5/0016* (2013.01); *B62B 7/145* (2013.01); *B62B 9/12* (2013.01); *B62B 9/28* (2013.01)

(58) Field of Classification Search
  CPC  B62B 7/14; B62B 7/142; B62B 7/145; B62B 9/00; B62B 9/12; B62B 9/28
  See application file for complete search history.

(56) References Cited

U.S. PATENT DOCUMENTS

| | | | |
|---|---|---|---|
| 2,422,862 A | 6/1947 | Stottrup | |
| 2,645,502 A * | 7/1953 | Collins et al. | 280/31 |
| 3,442,527 A | 5/1969 | Gottfried et al. | |
| 3,738,600 A | 6/1973 | Harper | |
| 4,449,732 A * | 5/1984 | Surot | 280/644 |
| 4,921,261 A * | 5/1990 | Sadler et al. | 280/30 |
| 5,308,103 A * | 5/1994 | Chin-Shung | 280/655 |
| 5,312,006 A * | 5/1994 | Lag | 211/195 |
| 5,499,831 A | 3/1996 | Worth et al. | |
| 5,772,279 A * | 6/1998 | Johnson, Jr. | 297/130 |
| 6,189,914 B1 | 2/2001 | Worth et al. | |
| 6,193,263 B1 | 2/2001 | Lin | |
| 6,286,844 B1 | 9/2001 | Cone, II et al. | |
| 6,302,412 B1 | 10/2001 | Worth et al. | |
| 6,802,514 B2 | 10/2004 | Worth et al. | |
| 7,658,399 B2 | 2/2010 | Van Dijk | |
| 8,087,680 B2 | 1/2012 | Dotsey et al. | |
| 8,231,136 B2 | 7/2012 | Fiore, Jr. | |
| 2002/0056973 A1* | 5/2002 | Yang et al. | 280/647 |

(Continued)

*Primary Examiner* — Frank Vanaman
(74) *Attorney, Agent, or Firm* — Gardner Groff Greenwald & Villanueva, PC (57) ABSTRACT

An adapter removably mounts to a stroller or other child-supporting device, and a range of different child carriers can be removably mounted to the adapter and thus the stroller. The adapter includes stroller-mounting assemblies that are compatible with the carrier-mounting assemblies of the stroller. A peripheral frame is supported by the stroller-mounting assemblies and in turn supports the selected carrier in a snugly nested arrangement. To enable use with various different carriers, the peripheral frame includes an adjustable frame member that slides backward and forward between retracted and extended positions for use with smaller and larger carriers, respectively. Lock assemblies selectively retain the adjustable frame member in position, and an actuator assembly operates the lock assemblies. A position-indicating system can provide a visual indication of the position of the adjustable frame member. Straps or other carrier-securing assemblies can restrain the carrier on the adapter.

21 Claims, 10 Drawing Sheets

(56) References Cited

U.S. PATENT DOCUMENTS

| | | |
|---|---|---|
| 2002/0093177 A1 | 7/2002 | Chen |
| 2003/0111825 A1 | 6/2003 | Lo et al. |
| 2005/0127640 A1 | 6/2005 | Worth et al. |
| 2007/0257471 A1 | 11/2007 | Myers et al. |
| 2010/0230933 A1 | 9/2010 | Dean et al. |
| 2014/0159358 A1* | 6/2014 | Chen et al. .................. 280/769 |

* cited by examiner

CHILD-CARRIER MOUNTING ADAPTER

CROSS-REFERENCE TO RELATED APPLICATIONS

This application claims the benefit of U.S. Provisional Patent Application Ser. No. 61/879,862 filed Sep. 19, 2013, the entirety of which is hereby incorporated herein by reference for all purposes.

TECHNICAL FIELD

The present invention relates generally to the field of child travel systems, and more particularly to mountings for child carriers of car seats and strollers.

BACKGROUND

Conventional travel systems for children commonly include car seats and strollers. The car seats typically include a base that removably mounts to a vehicle seat and the strollers typically include a wheeled frame, with a child carrier provided that can be removably mounted to the car-seat base or the stroller frame. In this way, parents can transport a child in a car seat in the family car, then upon arrival simply dismount the carrier (holding the child) from the car-seat base and mount it to a stroller (e.g., carried in the back of the car). This is especially helpful when the child is sleeping and would be awakened if removed from the carrier.

A drawback to these child travel systems is that carriers from different manufacturers are not compatible with car-seat bases and stroller frames of other manufacturers. So if parents have an existing car seat and want to purchase a new stroller, they're typically limited to either buying a stroller made by the same manufacturer as the existing car seat (assuming a compatible model is still available) or buying a new stroller and car seat travel system (even though the existing car seat still had plenty of life left in it).

To address this problem, some companies have introduced adapters for stroller frames that permit a carrier from a different manufacturer and/or of a different style to be used with their stroller frame. But such adapters have not proven entirely satisfactory. Some adapters work with carriers of only one or two manufacturers, other adapters work with carriers of three or four manufacturers but are overly complicated and difficult to use, and no adapters are known to work safely with carriers of a larger number of manufacturers.

Accordingly, it can be seen that needs exist for better ways to use child carriers with non-compatible stroller frames. It is to the provision of solutions meeting these and other needs that the present invention is primarily directed.

SUMMARY

Generally described, the present invention relates to a mounting adapter for a stroller or other child-supporting device that is adjustable to permit a range of different child carriers to be used with the stroller. The adapter includes stroller-mounting assemblies that are compatible with the carrier-mounting assemblies of the stroller so that the adapter removably mounts to the stroller. The adapter further includes a peripheral frame that is supported by the stroller-mounting assemblies and that in turn supports the selected carrier. The peripheral frame defines a frame opening through which a smaller lower portion of the carrier can be received but through which a larger upper portion of the carrier cannot, so that the carrier is snugly nested in the frame opening and stably supported by the frame.

To enable use with various different carriers, the peripheral frame is adjustable to select the size of the frame opening. In typical embodiments, the peripheral frame includes an adjustable frame member that slides backward and forward between retracted and extended positions for use with shorter and longer carriers, respectively. Lock assemblies are provided to selectively retain the adjustable frame member in a desired position or release it for adjustment, and at least one actuator assembly is provided to operate the lock assemblies. In this way, the adapter permits an existing stroller to be used with a wide range of different non-compatible carriers from non-compatible car seats.

In addition, a position-indicating system can be included to provide a visual indication of the position of the adjustable frame member and thus the corresponding size of the frame opening. Straps or other carrier-securing assemblies can be provided to restrain the carrier on the adapter for example by being looped around the handle-hubs of the carrier. A folding system can also be included to permit the stroller-mounting assemblies to be folded into a compact arrangement for storage.

These and other aspects, features, and advantages of the invention will be understood with reference to the drawing figures and detailed description herein, and will be realized by means of the various elements and combinations particularly pointed out in the appended claims. It is to be understood that the foregoing summary and the following brief description of the drawings and detailed description of the example embodiments are exemplary and explanatory of certain embodiments of the invention, and are not restrictive of the invention, as claimed.

DETAILED DESCRIPTION OF EXAMPLE EMBODIMENTS

The present invention may be understood more readily by reference to the following detailed description of example embodiments taken in connection with the accompanying drawing figures, which form a part of this disclosure. It is to be understood that this invention is not limited to the specific devices, methods, conditions, or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, for example by use of the antecedent "about," it will be understood that the particular value forms another embodiment.

Figure 1:
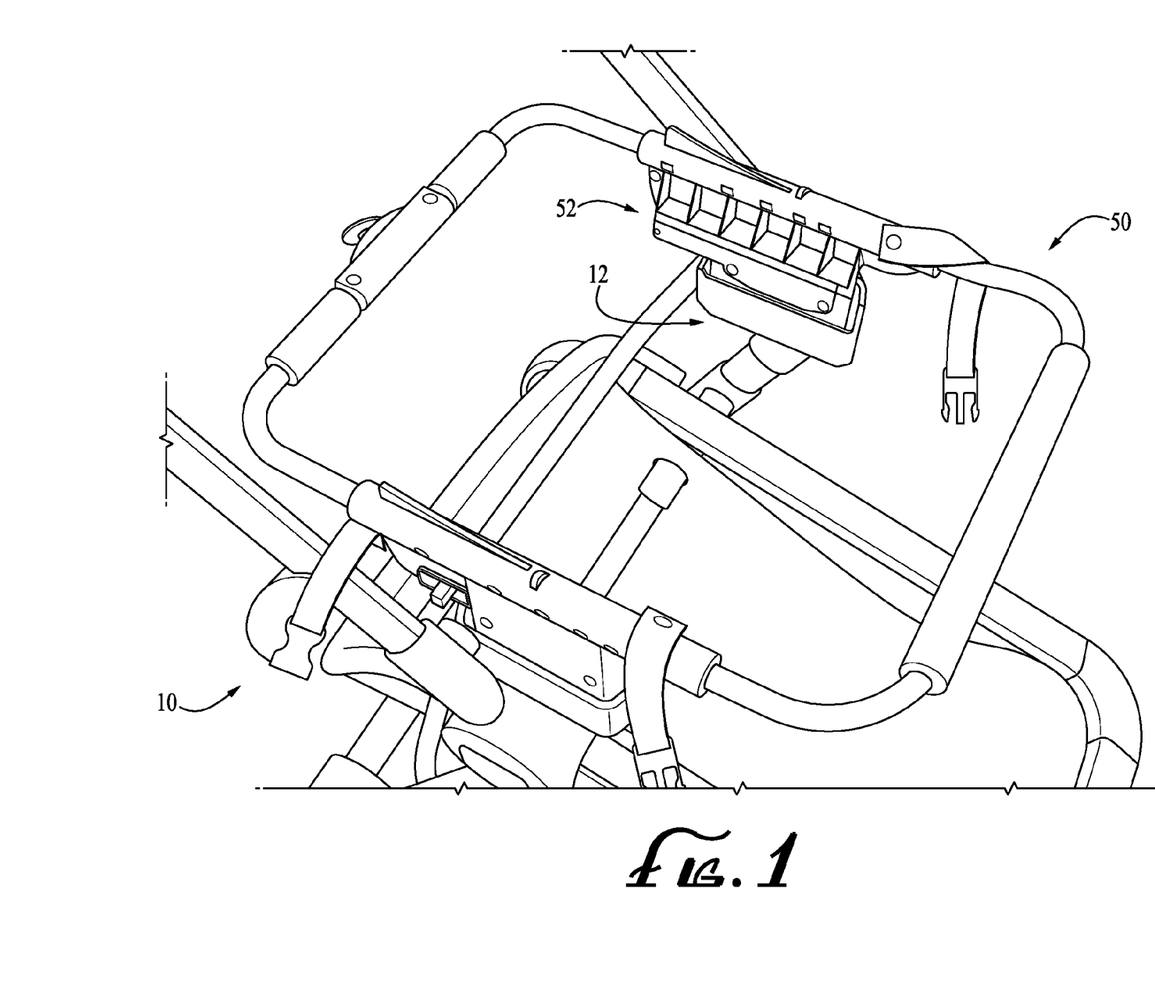
FIG. 1 is a perspective view of an adjustable child-carrier mounting adapter according to an example embodiment of the present invention, showing the adapter removably mounted to a portion of a stroller frame and ready to receive a child carrier.
Figure 2:
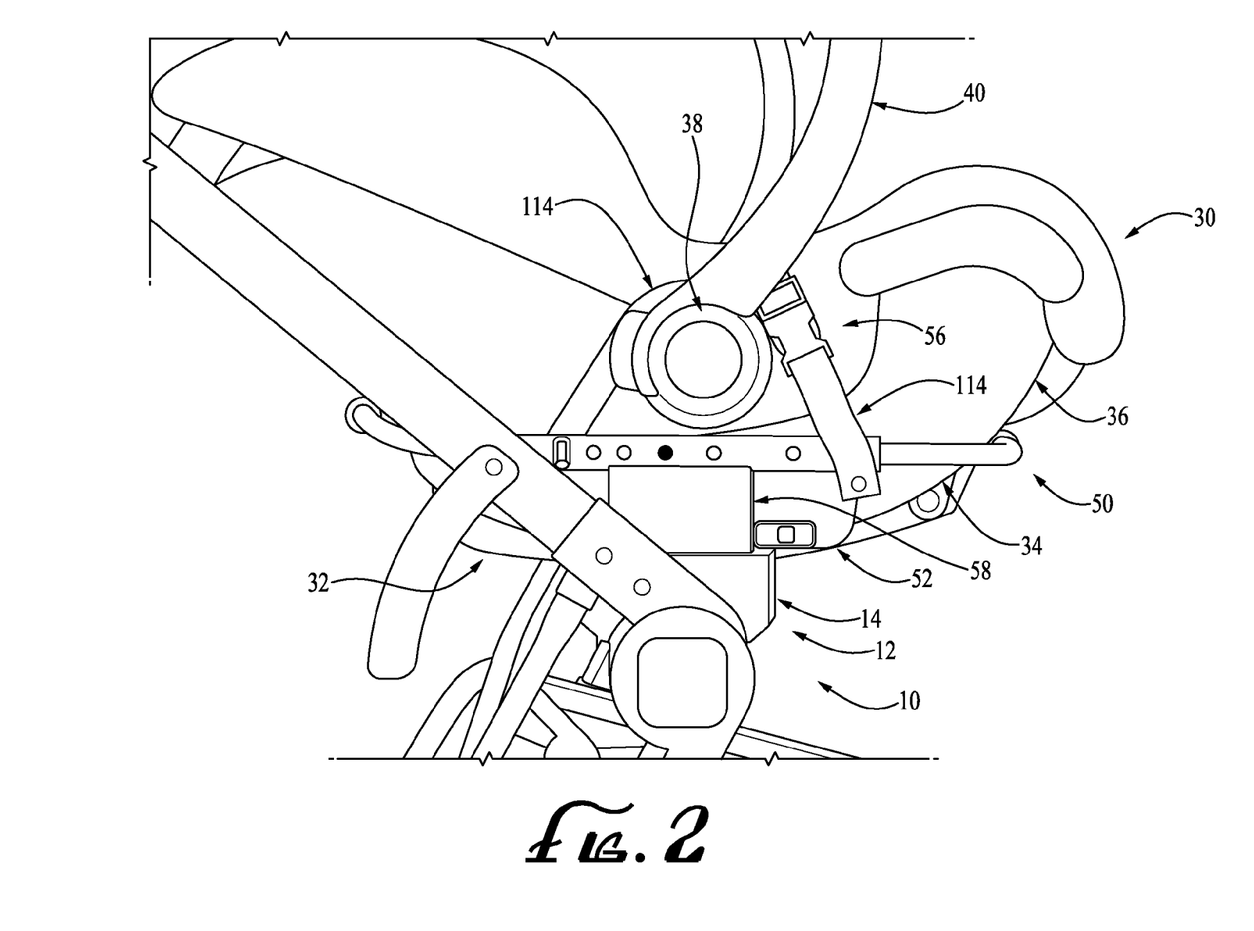
FIG. 2 is a side view of the adapter and stroller portion of FIG. 1, showing a child carrier removably mounted to the adapter in a use position.

With reference now to the drawing figures, wherein like reference numbers represent corresponding parts throughout the several views, FIGS. 1-19 show an adjustable child-carrier mounting adapter 50 according to an example embodiment of the present invention. As shown in FIGS. 1-2, the adapter 50 removably mounts to a stroller frame 10 such that a child carrier 30 not designed for use with the stroller can be removably mounted to the stroller via the adapter.

Referring additionally to FIGS. 3-7, the adapter 50 includes two stroller-mounting assemblies 52, a carrier-supporting assembly 54, and at least one carrier-securing assembly 56. These major assemblies of the adapter 50 can be made of conventional materials such as metal (e.g., aluminum) and plastic (e.g., ABS) using conventional fabrication techniques and equipment such as extruding and molding, as will be readily understood by persons of ordinary skill in the art.

The stroller-mounting assemblies 52 removably mount to respective carrier-mount assemblies 12 of the stroller frame 10 (i.e., where a compatible carrier would ordinarily be mounted). Thus, each stroller-mounting assembly 52 is typically of the same basic design as that included on carriers designed for use with and thus compatible with the stroller frame 10. As such, the stroller-mounting assemblies 52 can be of a type well-known in the art, so excessive details are not included for brevity and to avoid repetition. As an example, though, the stroller-mounting assemblies 52 can be latch-type mechanisms each including a tower 58 and a locking latch 60, with the tower engaging a base 14 of the respective stroller carrier-mount assembly 12, and with the latch movable between a locked position engaging a catch surface (not shown) of the respective stroller carrier-mount assembly and an unlocked position clear of the catch surface. A typical embodiment of the stroller-mounting assemblies 52 is depicted in FIGS. 1-3 and 18-19, and an alternative embodiment of the stroller-mounting assemblies is depicted in FIGS. 4-8. Compatible carriers including these basic stroller-mounting assemblies 52, and compatible strollers 10 including these carrier-mount assemblies 12, are included in commercially available travel systems sold under the brand name INGENUITY (Kids II, Inc., Atlanta, Ga.). In other embodiments, the stroller-mounting assemblies are of a different design, latch-type or not, which other designs can be readily incorporated into the adapter by person of ordinary skill in the art to permit the adapter to be removably mounted to strollers having other compatible designs of carrier-mount assemblies. For example, the stroller-mounting assemblies can be designed for compatibility with mounting assemblies (on the stroller or other child-supporting device) that are designed for interoperability with a device other than a carrier, such as a toddler seat or a child-carrier adapter with a specialized mounting.

In some embodiments, the adapter is modified to mount to an additional or alternative child-supporting device such as swing stand, a rocker frame, a non-moving frame stand, or a highchair frame, such that the carrier is removably mounted to the child-supporting device via the adapter. Thus, in some embodiments the stroller-mounting assemblies (i.e., the child-supporting device mounting assemblies) are modified to enable the adapter to mount to such another child-supporting device instead of or in addition to mounting to the stroller child-supporting device.

The carrier-supporting assembly 54 includes a peripheral frame 62 supported by the stroller-mounting assemblies 52. The peripheral frame 62 defines an opening 64 through which the seat shell 32 of the carrier 30 can be partially received to support the carrier. That is, the lower portion 34 of the carrier seat shell 32 has a smaller footprint at a horizontal cross-section (when in an upright use position) than the upper portion 36, so the seat-shell's smaller-footprint lower portion can be lowered down through the frame opening 64 until its larger-footprint upper portion that cannot fit through the opening is resting stably on supported by the peripheral frame 62 in a snugly nested manner due to the forces of gravity. Conventional carriers 30 have seat shells 32 that have a horizontal cross-section (when in an upright use position) that is generally rectangular in shape. As such, the peripheral frame 62 and the frame opening 64 are typically generally rectangular in shape, as depicted. In other embodiments, however, the peripheral frame can define an opening with another regular or irregular shape selected for receiving other carrier seat shells supported by the frame. In the depicted embodiment, the peripheral frame 62 is continuous (i.e., it forms a closed loop or ring), though in other embodiments the frame can include two cooperating but unconnected (or connected by not rigidly and/or fixedly so) frame members so long as they define an opening that receives carrier seat shells supported by the frame members.

In typical commercial embodiments, the peripheral frame 62 is formed by two frame connectors 66 and first and second frame members 68 and 70 coupled to the connectors. The frame connectors 66 can be provided as part of hubs 72 that include the stroller-mounting assemblies 52, in other words one of the frame connectors and one of the stroller-mounting assemblies are a single integral hub part. As such, the frame connectors 66 (and the stroller-mounting assemblies 52) are typically positioned at sides of the adapter 50, with the first and second frame members 68 and 70 extending rearward and forward from the frame connectors. In other embodiments, the frame connectors and the stroller-mounting assemblies are separate components that are attached together with the frame connectors supported by the respective stroller-mounting assemblies, or the frame connectors couple to one of the frame members and the other frame member couples to it.

The first and second frame members 68 and 70 can be tubular (as depicted), solid, or otherwise-formed, with a cross-section that is generally circular (as depicted), rectangular, polygonal, or otherwise-shaped. The first and second frame members 68 and 70 are typically generally C-shaped (when viewed from above) to provide the generally rectangular-shaped opening 64. In other embodiments, the frame members can be provided in other shapes, for example, each can include two parallel generally-linear side pieces and a separate generally-linear front (or rear) piece extending between them (e.g., so for the second frame member the adjustable functionality described below can be provided by the end pieces sliding along the side pieces).

The first and second frame members 68 and 70 can be coupled to the frame connectors 66 in a coaxial, side-by-side, or other arrangement. In the depicted embodiment, for example, the first and second frame members 68 and 70 have first and second end sections 72 and 74 that are telescopically received in first and second bores 76 and 78 of the frame connectors 66. As such, the first and second end sections 72 and 74 and the first and second bores 76 and 78 can have a shape and sizes selected for being telescopically arranged together.

The first frame member 68 is fixedly mounted to the frame connectors 66 by fasteners such as rivets or screws. As such, the first frame member 68 is also referred to sometime herein as the fixed frame member. In other embodiments, the first frame member is adjustably mounted to the frame connector to provide for adjustability of the frame opening, for example in the same or a similar manner as the second frame member, as described herein.

The second frame member 70 is adjustably mounted to the frame connectors 66 to provide adjustability of the frame opening 64 in order to accommodate different (from different manufacturers and/or of different types) carriers 30. In this way, a variety of different carriers 30 can be used with a stroller frame 10 that the carriers were not designed for use with (i.e., carries that do not have compatible stroller-mounting assemblies). In particular, the frame opening 64 can be adjusted to have a length selected so that a given carrier 30 is snugly fitted down through and into it. As such, the second frame member 70 is also referred to sometime herein as the adjustable frame member. In other embodiments, the adjustable frame member is adjustably coupled to the fixed frame member (which in turn is mounted to and supported by the stroller-mounting assemblies) or to another component of the peripheral frame (including frame connectors that are not integral to the stroller-mounting assemblies and frame-coupling components that are integral to the stroller-mounting assemblies and thus considered to be frame connectors).

To provide this adjustability, the second/adjustable frame member 70 slides relative to the frame connectors 66. In the depicted embodiment the second end sections 74 of the second frame member 70 are telescopically received in the second bore 78 of the frame connectors 66 (as described above) with sizes and a shape to permit sliding motion between the parts. In other embodiments, the second frame members are adjustably coupled to the frame connectors in a side-by-side arrangement, for example, by a guide track, a tongue-and-groove system, a bayonet fitting, or another adjustable coupling system. In other embodiments, the second frame members are adjustably coupled to the frame connectors by a system operable by pivoting to unlock the second frame members, extending/retracting them, and pivoting them back to relock. In addition, the frame connectors 66 can each include an insert 80 that defines the second bore 78 and that is received by and fixedly attached to the main body of the respective frame connector for added strength and smoothness of operation.

Figure 7:
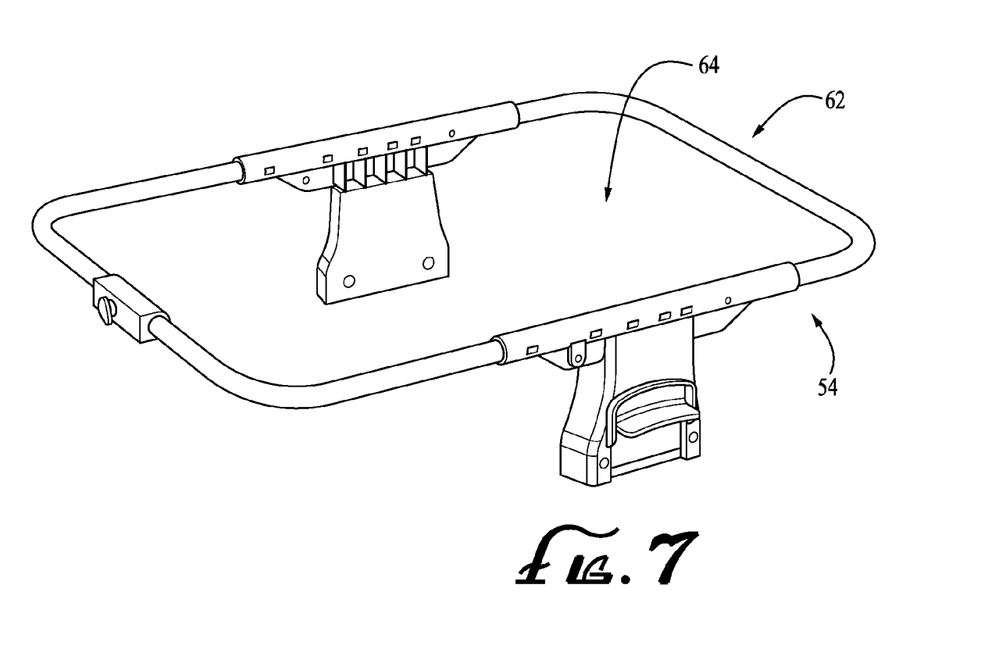
FIG. 7 shows the alternative adapter of FIG. 6 adjusted to its extended position.
Figure 8:
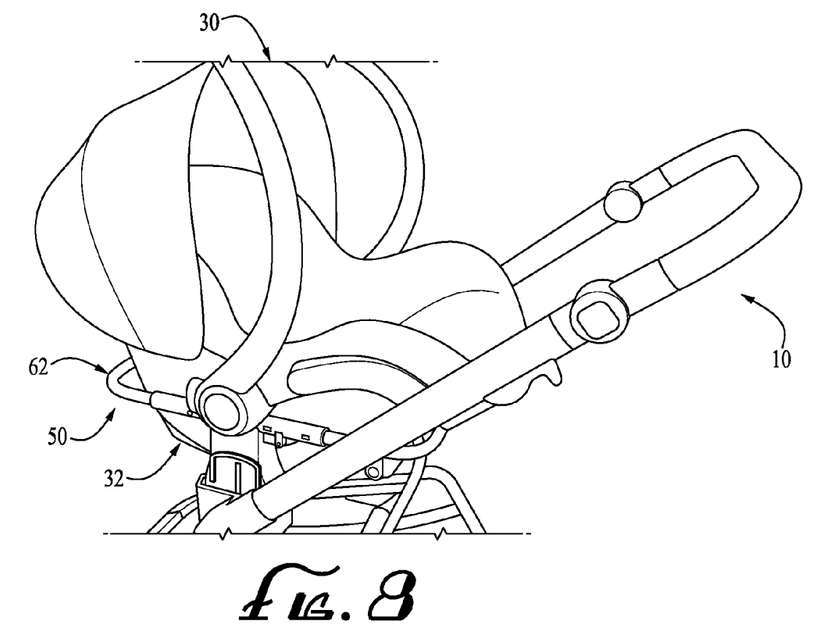
FIG. 8 is a perspective view of the alternative adapter of FIG. 4, and stroller portion of FIG. 2, showing the adapter mounted to a stroller and adjusted to its retracted position of FIG. 6 with a different child carrier removably mounted to the adapter in a use position.
Figure 9:
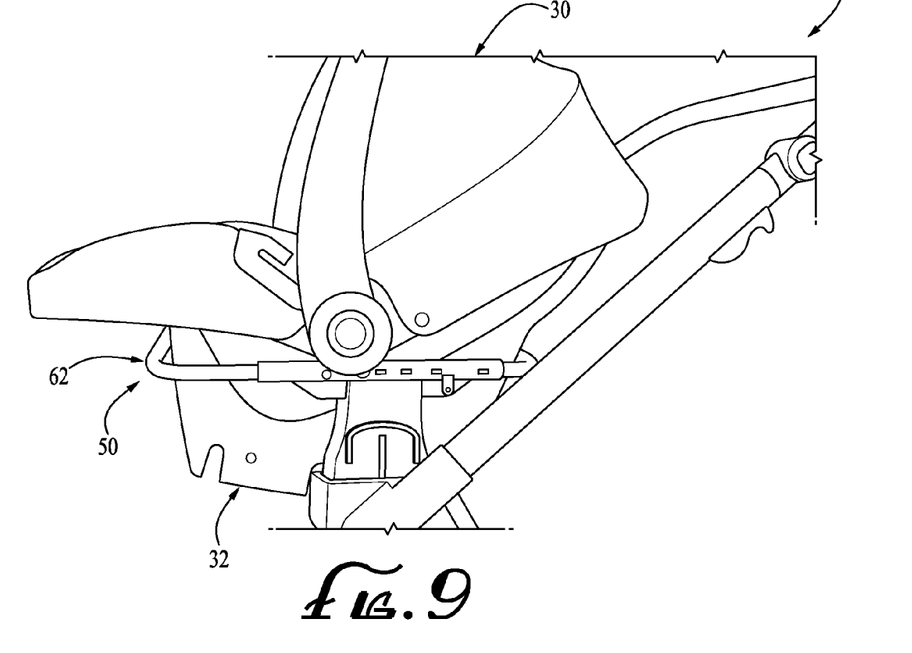
FIG. 9 shows the alternative adapter and stroller portion of FIG. 7 with the adapter adjusted to its extended position of FIG. 6 and another different child carrier removably mounted to the adapter in a use position.
Figure 10:
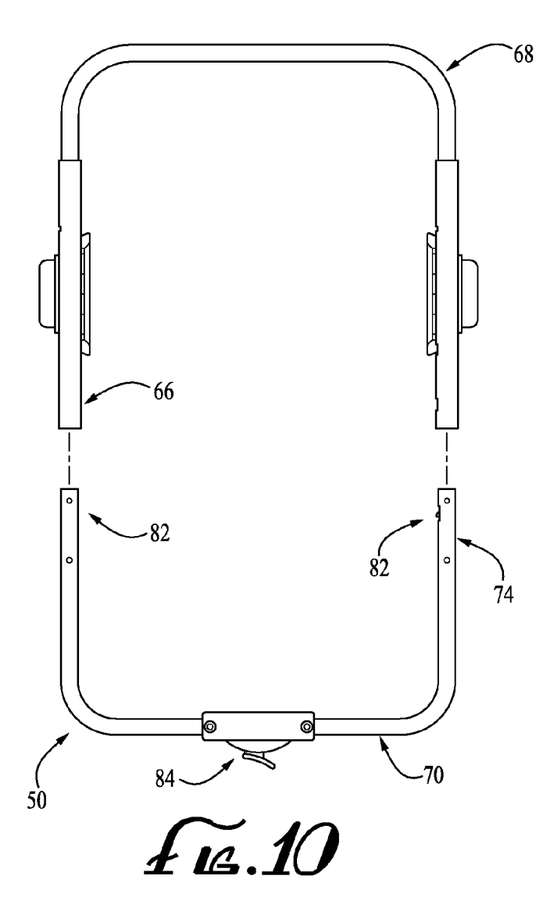
FIG. 10 is a top view of the adapter of FIG. 1 showing its adjustable frame member disassembled from the adapter for clarity of illustration.
Figure 11:
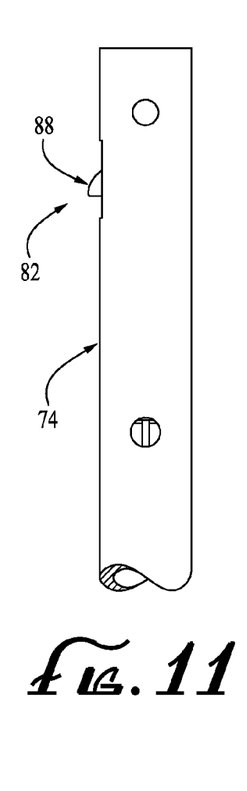
FIG. 11 shows a portion of a locking mechanism of the adapter of FIG. 10 in its locking position.
Figure 12:
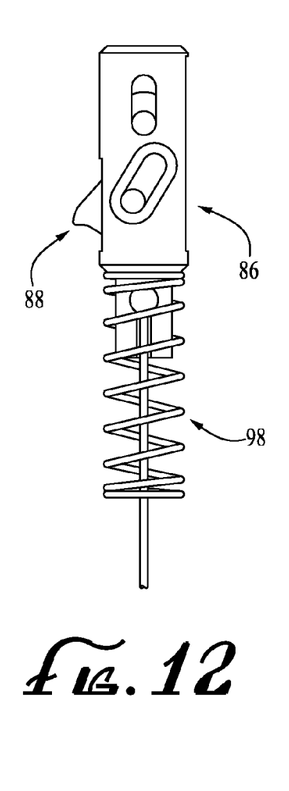
FIG. 12 shows an internal plunger of the locking mechanism portion of FIG. 11.

In any event, the adjustable frame member 70 slides relative to the frame connectors 66 between a retracted position (see FIGS. 6 and 8) and an extended position (see FIGS. 7 and 9). In the retracted position the frame opening 74 has a relatively smaller length so that it can receive and support carriers 30 with shorter seat shells 32, and in the extended position the frame opening has a relatively longer length so that it can receive and support carriers with longer seat shells. For example, the adapter opening 74 can be about 15 inches long in the retracted position and about 20 inches long in the extended position. In some embodiments the adjustable frame member 70 slides relative to the frame connectors 66 into one or more intermediate positions (in which the frame opening 74 has intermediate lengths) between the retracted and extended positions. For example, the adapter 50 can be adjusted to a total of five positions in the depicted embodiment.

Preferably, the adapter 50 can be mounted to the stroller 10 with either the adjustable frame member 70 or the fixed frame member 68 facing forward. This can be provided by including conventional locking features of the stroller-mounting assemblies 52 that are symmetrical about a vertical lateral centerline plane (facing forward and rearward), such as those commercially available under the brand name INGENUITY as described above, so that they are not unidirectional. This versatility enables use of the stroller 10 via the adapter 50 with an even wider range of different carriers 30.

In order to secure the adjustable frame member 70 in its various positions relative to the frame connectors 66, a releasable securement mechanism is included. The releasable securement mechanism includes two lock assemblies 82 and at least one actuator assembly 84 operable to manipulate the lock assemblies between a locked position securing the adjustable frame member 70 in place to the frame connectors 66 and an unlocked position not securing the adjustable frame member so that it can be adjusted. In particular, each lock assembly 82 includes a catch surface and a lock member that is movable to engage or release the catch surface to selectively retain the adjustable frame member in the retracted or extended position or to release the adjustable frame member for adjustment. Thus, the actuator assembly 84 can be operated to free the adjustable frame member 70 from locking engagement with the frame connectors 66 so that it can be moved/adjusted between the retracted and extended positions, and to then lock the adjustable frame member in place for use.

Figure 13:
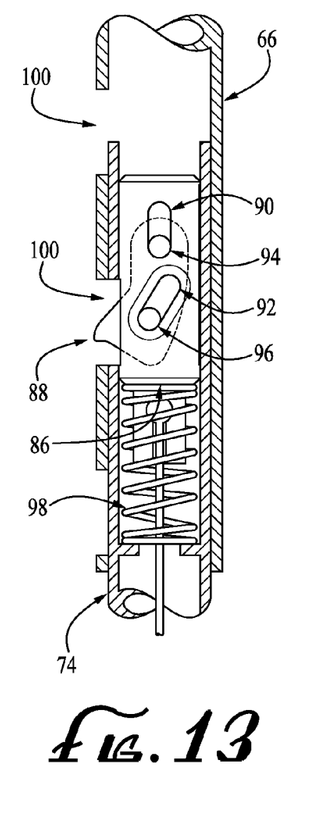
FIG. 13 is a partial cross-sectional view of the locking mechanism of the adapter of FIGS. 10-12 shown in its locking position.
Figure 14:
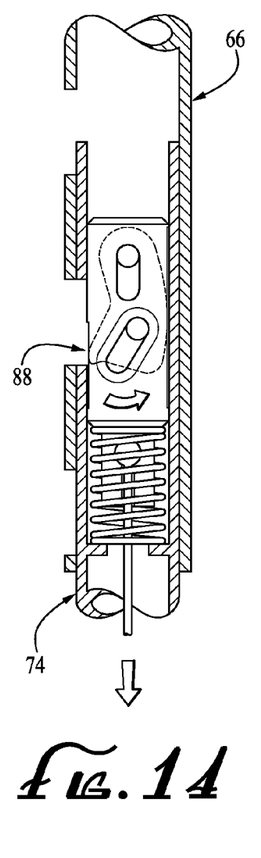
FIG. 14 shows the locking mechanism of the adapter of FIG. 14 shown actuated to its unlocking position.
Figure 15:
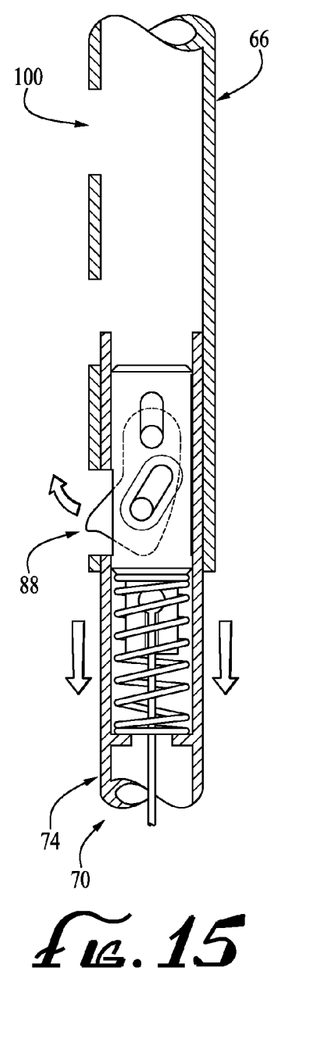
FIG. 15 shows the locking mechanism of the adapter of FIG. 14 shown returned to its locking position after the adjustable frame member has been repositioned to the extended position.

Referring additionally to FIGS. 10-17, in the depicted embodiment the lock assemblies 82 each include a plunger 86 that holds a tab lock member 88 that moves relative to the plunger between an extended lock position (FIGS. 11-13 and 15) and a retracted unlocked position (FIG. 14). As shown in FIGS. 13-15, the retracting and extending movement of the tab 88 can be guided by axial and angled slots 90 and 92, respectively (each defined by at least two facing surfaces), a pivot pin 94 extending between the tab and the frame end section 74 through the axial slot, and a guide pin 96 extending from the tab into the angled slot. The pivot pin 94 extending through the axial slot 90 of the plunger 86 allows the plunger (but not the tab 86) to axially move, so the angled slot 92 drives the guide pin 96 to move transversely, thereby retracting and extending the tab between positions. The plunger 86 can be biased by a spring 98 toward the extended lock position. For example, the spring 98 can be a coil compression spring retained between the plunger 86 and an inner flange in the end section 74 of the adjustable frame member 70.

The tabs 88 can be selectively aligned with and received in each of a series of position openings (defining catch surfaces) 100 formed in the frame connector 66. The position openings 100 can be for example in the form of through-holes having a shape that is rectangular (as depicted), circular, or otherwise-shaped. Thus, when the adjustable frame member 70 is in the extended position, the tabs 88 are received in a first one of the serial position openings 100 (FIG. 15). And when the adjustable frame member 70 is in the retracted position, the tabs 88 are received in a last one of the serial position openings 100.

In other embodiments, the lock assemblies can be provided by other conventional mechanisms operable to selectively lock and unlock the adjustable frame member relative to the frame connector. For example, the lock assemblies can be provided by mating gears (e.g., a rack and pinion gearset), spring-biased push-pins receivable in the position openings, pins receivable in the position openings when aligned with a pilot opening of the adjustable frame member, repositionable tabs on the frame connector that mate with position openings in the adjustable frame member (i.e., a vice versa arrangement), tabs that releasably engage position notches in or inner projections on the frame connector (instead of the position through-holes), and/or other types of lock assemblies that include a lock member that is movable to engage and disengage each of a series of catch surfaces in locked and unlocked positions.

The at least one actuator assembly 84 is operable to manipulate the lock assemblies 82 between their locked and unlocked positions. One actuator assembly 84 can be provided operating both lock assemblies 82 (as depicted) to provide for simultaneous one-handed operation, or a dedicated actuator assembly can be provided for each lock assembly.

Figure 16:
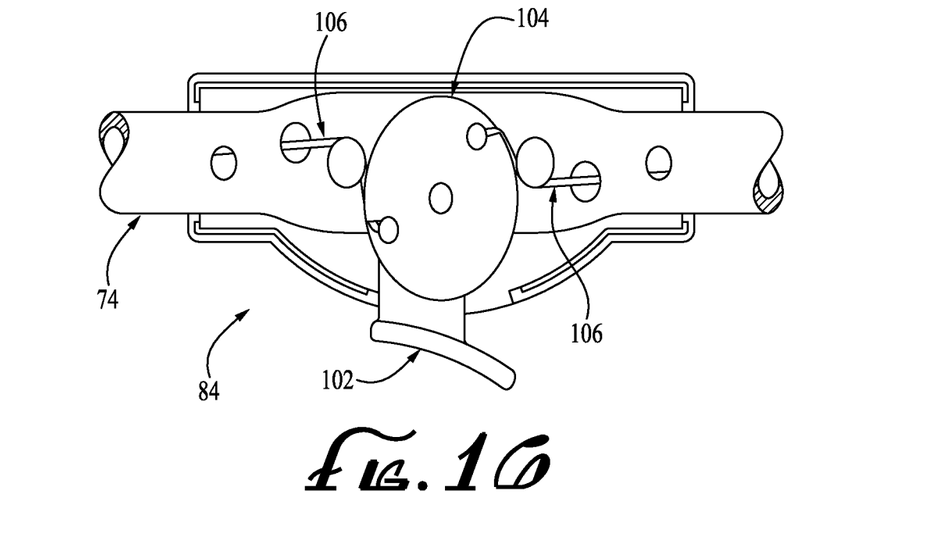
FIG. 16 is a partial cross-sectional view of an actuator of the adapter of FIG. 1 shown in its locking position.
Figure 17:
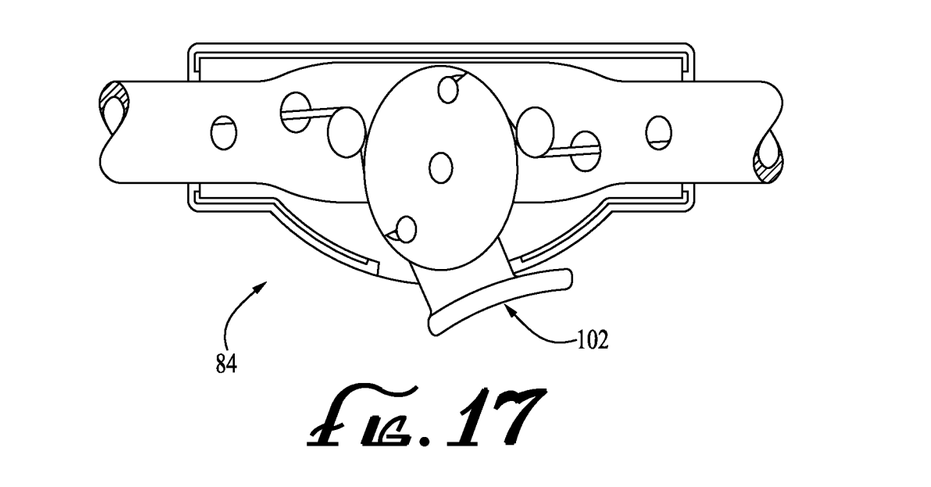
FIG. 17 shows the actuator of FIG. 16 in its unlocking position.

Referring additionally to FIGS. 16 and 17, in the depicted embodiment the actuator assembly 84 includes an actuator member 102, a drive member 104 attached to or extending from the actuator member, and two linkages 106 extending between the drive and the plungers 86 (or another element of the lock assemblies 82). The actuator member 102 can be pivotal between locked and unlocked positions (see FIGS. 16 and 17, respectively). The drive member 104 can be provided by a rotor/pulley that is rotationally mounted to the adjustable frame member 70 within a housing. The linkages 106 can be provided by cords, cables, wires, strings, or other flexible connectors, which can be routed around pins to facilitate their operational movement. When the actuator member 102 is pivoted from the locked position toward the unlocked position, the rotor 104 rotates, which pulls on the connectors 106, which in turn pull on the plungers 86 to cause them to move axially relative to the end section 74 of the adjustable frame member 70, which moves the tabs 88 from the locked position to the unlocked position. When the actuator member 102 released, the plunger returns to the locked position under the influence of the biasing spring 98.

In other embodiments, the actuator assemblies can be provided by other conventional mechanisms selectively operable to manipulate the lock assemblies between the locked and unlocked positions. For example, the actuator assembly can include a slide, pivot, or push-button actuator member operable to move the drive to apply a tensional force on the connectors, and/or it can include a slide or plunger drive that can be driven by the actuator member to apply the tensional force on the connectors. Or the linkage can be connected directly to the actuator member (e.g., a drive member can be considered to be an integral part of the actuator member). Also, one biasing spring can be provided as a part of the actuator assembly (acting on the actuator member or the drive member) instead of two as parts of the lock assemblies.

While this embodiment is adjustable in the front/back directions (relative to the stroller 10), other embodiments can be adapted to include additional adjustability. For example, in some embodiments the peripheral frame is laterally adjustable (e.g., to narrower than the stroller-mounting assemblies 52 to avoid interference therewith) and in some embodiments it is vertically adjustable (e.g., to higher relative to the stroller-mounting assemblies to avoid interference therewith). These functionalities can be provided by adjustment mechanisms similar to those described herein or by others.

Figure 18:
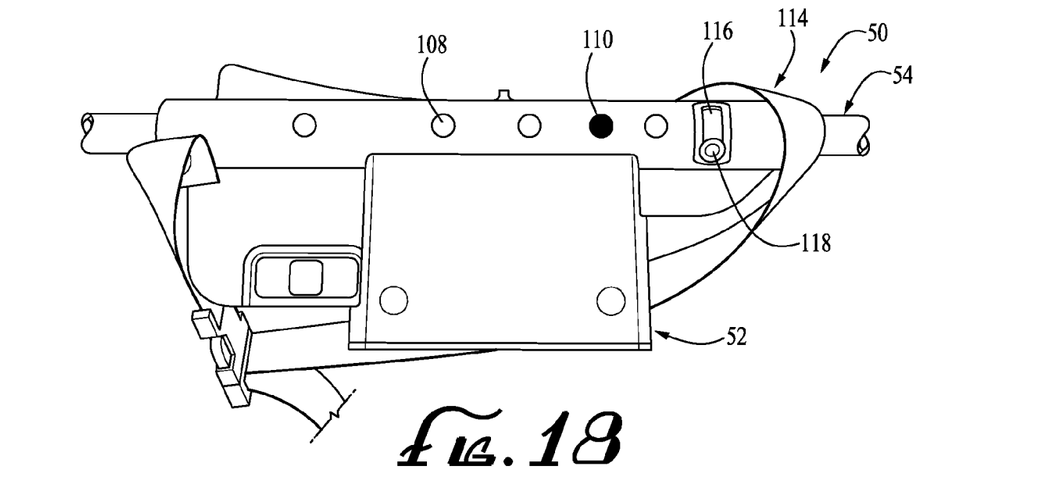
FIG. 18 is a perspective view of a portion of the adapter of FIG. 1, showing a position-indicating system and a folding system.

Referring additionally to FIG. 18, the adapter 50 can further include a position-indicating system. For example, each frame connector 66 can include a series of windows 108 and each end section 74 of the adjustable frame member 70 can include a visual indicia (such as the depicted bright/contrasting-colored band or strip) 110 that is selectively alignable with and visible through the each of the serial windows to identify a corresponding position of the adjustable frame member. Thus, when the visual indicia 110 is visible through a first one of the windows 108, then the adjustable frame member 70 is indicated to be in the extended position. And when the visual indicia 110 is visible through a last one of the windows 108, then the adjustable frame member 70 is indicated to be in the retracted position.

Figure 3:
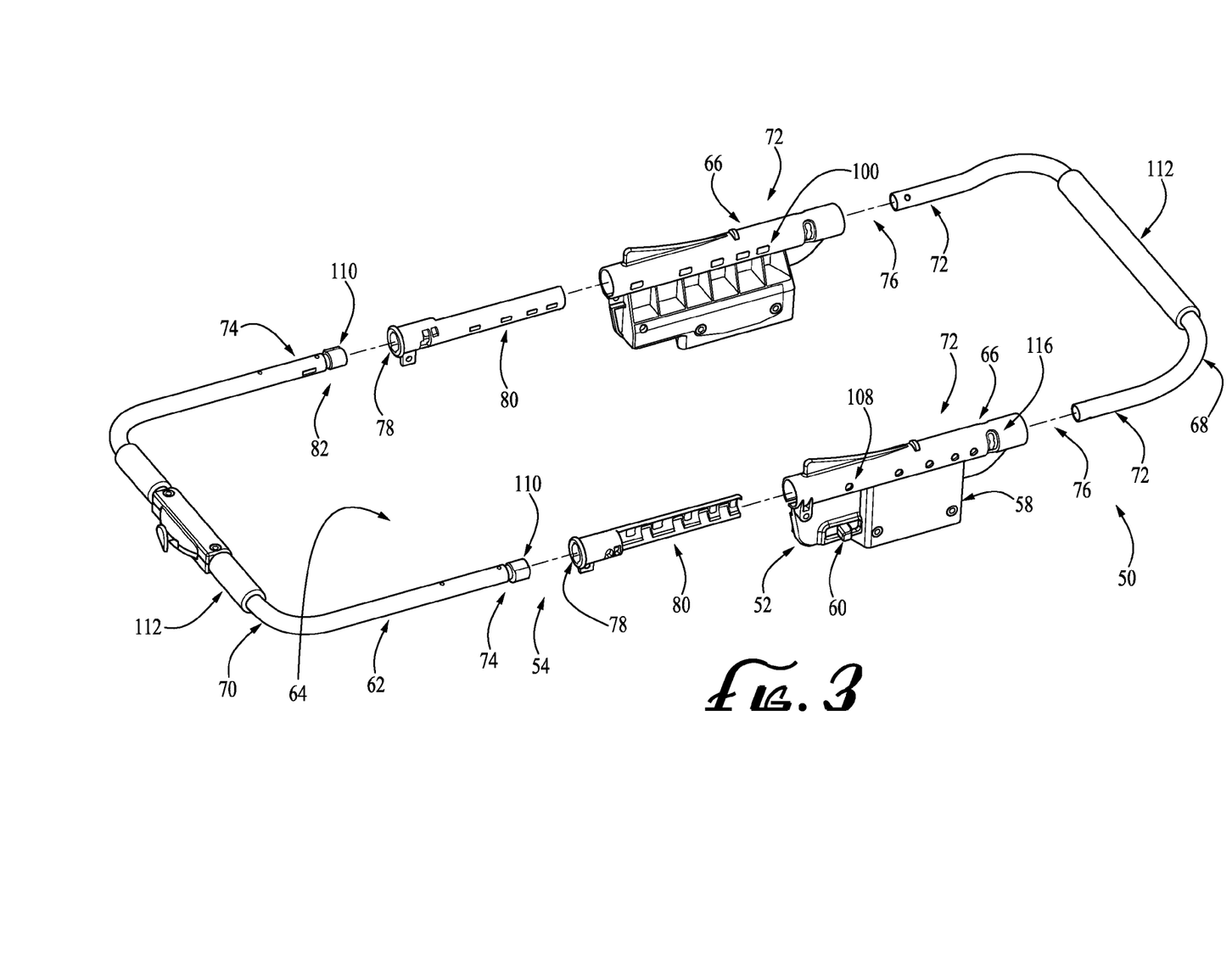
FIG. 3 is an exploded perspective view the adapter of FIG. 1.
Figure 4:
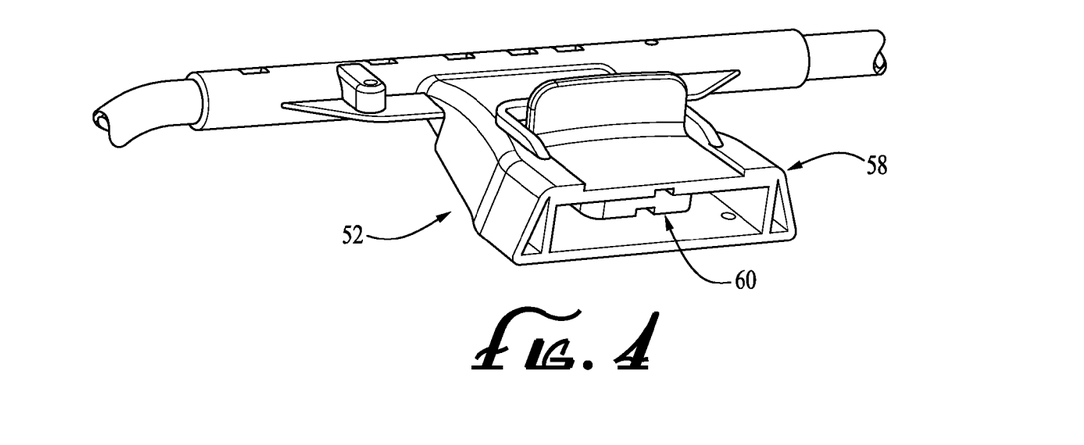
FIG. 4 is a perspective view of an alternative stroller-mounting assembly of the adapter of FIG. 1.
Figure 5:
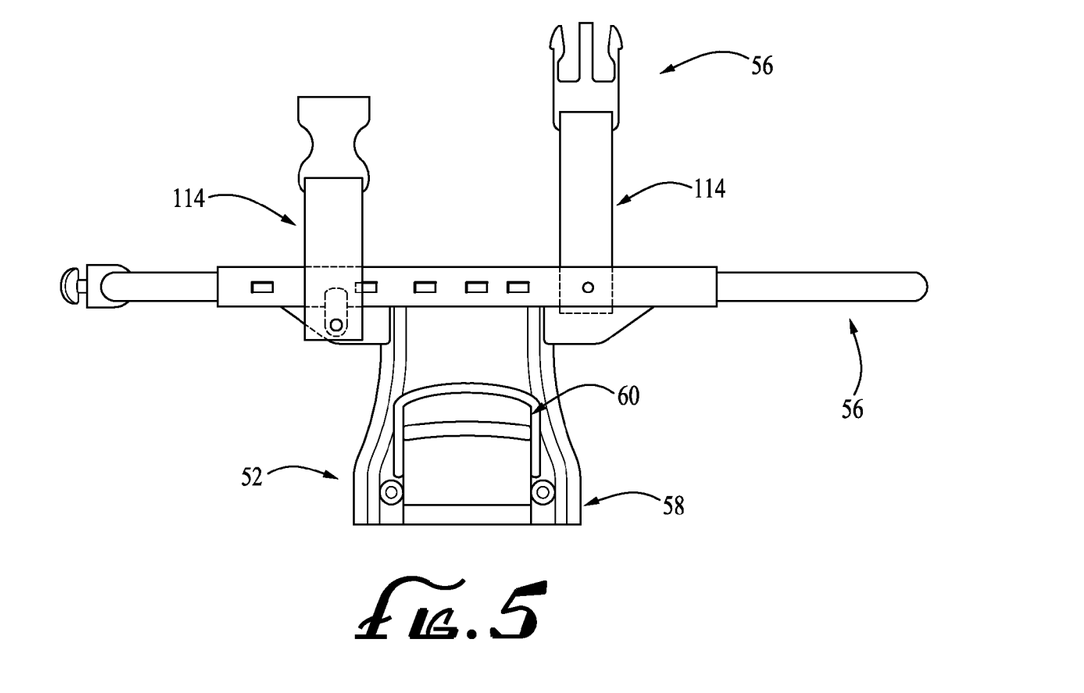
FIG. 5 is a side view of a carrier-securing assembly of the alternative adapter of FIG. 4.
Figure 6:
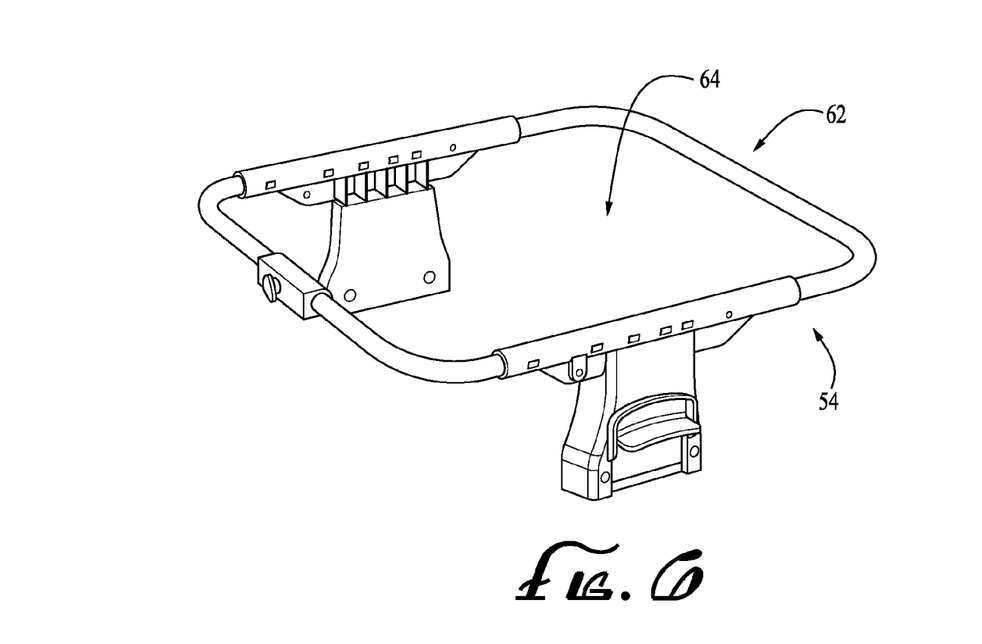
FIG. 6 is a perspective view of the alternative adapter of FIG. 4 shown adjusted to its retracted position.

Furthermore, the adapter 50 can include one or more grips 112 that help hold the carrier 30 in place on the peripheral frame 62 (see FIG. 3). For example, the grips 112 can be in the form of strips or sheaths of a soft material such as soft plastic or foam rubber on the front and rear sections of the peripheral frame 62.

While the peripheral frame 62 supports and snugly holds the selected carrier 30 in place on the stroller 10, an additional securement is preferable to mechanically lock the carrier to the adapter. For this reason, the carrier-securing assembly 56 is typically provided. The carrier-securing assembly 56 can include two flexible straps (e.g., webbing, cord, cable, chain, or the like) 114, one on each side of the adapter 50, that engage the carrier to secure it in place on the adapter 50 (see FIGS. 5 and 18-19). For example, each strap 114 can include two segments extending from the respective frame connector 66 and a coupling (e.g., a buckle or clasp) operable to releasably connect them together. A length-adjustment assembly can be included in the coupling to lengthen or shorten the effective usable portion of the strap segments. The straps 114 can thus be looped around the side-positioned handle hubs 38 of the carriers 30 and tightened to secure the carrier to the adapter 50 (the looped straps cannot be slid laterally past the upward-extending handle 40 and off the handle hub). The two segments of each strap 114 can extend from opposite sides of the respective frame connector 66 (one from the inside of the frame connector and the other from the outside), and on opposite ends (front and rear) of the frame connector 66, as depicted. In other embodiments, the straps include hooks, clips, clamps, or other couplings that releasably engage the carrier to secure it to the adapter, only one piece of strap per side of the adapter with a length and coupling for connecting the coupling to the carrier, only one piece of strap per side of the adapter with a length and coupling for looping around the carrier handle hub and connecting back to the frame connector, and/or strap configurations adapted to engage other structures of the carrier.

Figure 19:
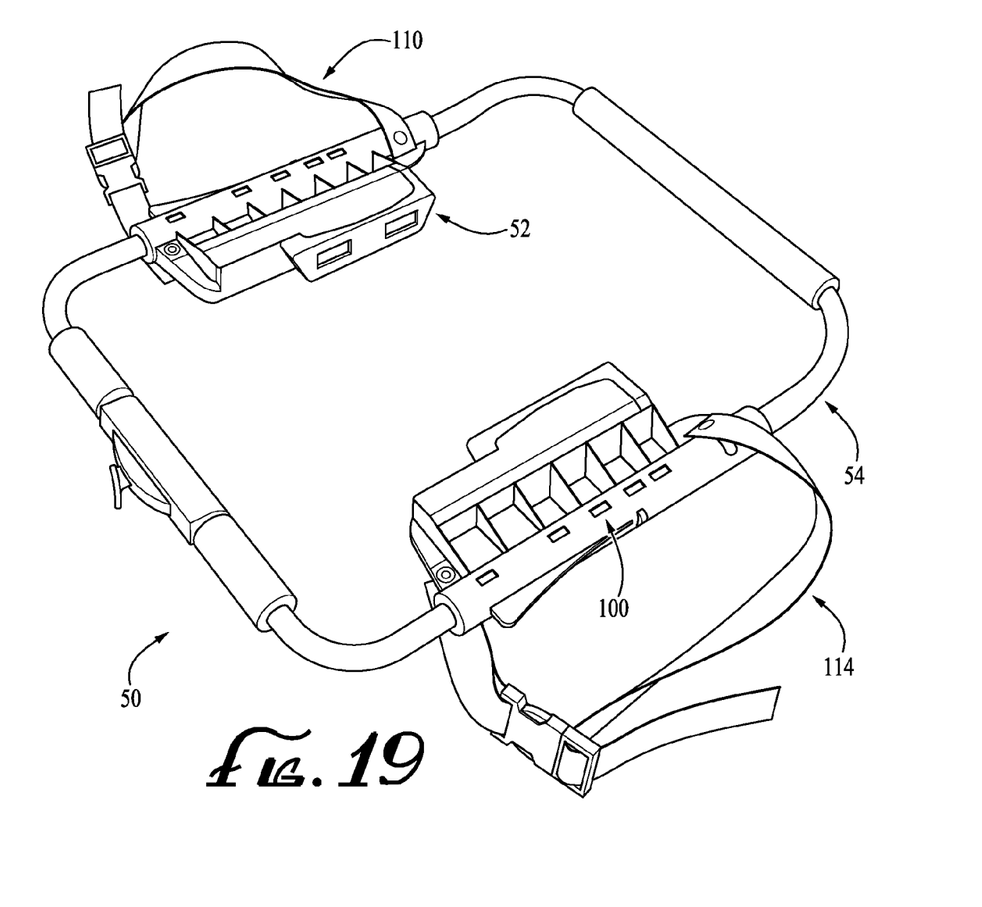
FIG. 19 is a bottom perspective view of the adapter of FIG. 1 shown in its folded position for compact storage.

Referring additionally to FIG. 19, the adapter 50 can further include a folding feature that enables the stroller-mounting assemblies 52 to pivot relate to the peripheral frame 62 from a use position (angled relative to and not in a plane defined by the peripheral frame, see FIG. 18) to a compact storage position (substantially within the peripheral frame plane, see FIG. 19). This folding feature can be provided by for example a keyway (e.g., two facing surfaces) 116 in the adapter hubs 72 (or a portion thereof, such as the frame connectors 66 or the stroller-mounting assemblies 52) and a pin (i.e., any projecting structure) 118 extending outward from the fixed frame member 68 and movably received in the keyway. The keyway 116 is slotted and circumferentially extending so that it permits and guides rotational movement of the respective adapter hub 72 relative to the fixed frame member 68. In this way, the adapter hubs 72 can be readily folded from the use position to the storage position as desired. (Of course, when the adapter 50 is mounted to the stroller 10 in use the hubs 72 cannot be folded in this way.) So in order to fold the hubs 72, all that is needed is to actuate the actuator assembly 84 to release the lock assemblies 82 so that the hubs 72 (or at least the stroller-mounting assemblies 52) can pivotally fold relative to the adjustable frame member 70. In other embodiments, the folding feature is provided in a vice versa arrangement, with the keyway formed in the fixed frame member and the pin extending inward from the adapter hubs (or a portion thereof).

While the invention has been described with reference to certain example embodiments, it will be understood by those skilled in the art that a variety of modifications, additions, and deletions are within the scope of the invention, as defined by the following claims.

What is claimed is:

1. An adapter for mounting a child carrier to a child-supporting device having at least one mounting assembly, the adapter comprising:

at least one child-supporting device mounting assembly that is compatible with the mounting assembly of the child-supporting device so that the adapter removably mounts to the child-supporting device;

a peripheral frame defining a frame opening through which a selected carrier is partially receivable to support the carrier by the peripheral frame in a nested arrangement, wherein the peripheral frame includes a first frame member and an adjustable second frame member adjustably coupled to the first frame member, with the adjustable second frame member repositionable relative to the first frame member between a retracted position and an extended position, with the frame opening defining a first dimension when the adjustable second frame member is in the retracted position, and with the frame opening defining a second dimension larger than the first dimension when the adjustable second frame member is in the extended position; and at least one lock assembly including a plunger that holds a lock member that is moveable between an engage and release position to selectively retain the adjustable second frame member in the retracted position or the extended position, and a biasing spring which biases the lock member in the engage position, wherein the lock member comprises a pivotal tab, a guide pin and a pivot pin, and wherein the plunger comprises an axial slot configured to engage the guide pin and an angled slot configured to engage the pivot pin;

wherein when the adjustable second frame member is in the retracted position the frame opening partially receives and the peripheral frame supports a first carrier, and wherein when the adjustable second frame member is in the extended positioned the frame opening partially receives and the peripheral frame supports a second carrier that is larger than the first carrier.

2. The child-carrier mounting adapter of claim 1, wherein the peripheral frame forms a continuous loop that is generally rectangular in shape.

3. The child-carrier mounting adapter of claim 1, wherein the adjustable second frame member telescopically slides between the retracted and extended positions.

4. The child-carrier mounting adapter of claim 1, wherein the adjustable second frame member is repositionable relative to the first frame member to at least one intermediate position between the retracted and extended positions.

5. The child-carrier mounting adapter of claim 1, wherein the peripheral frame further includes two frame connectors that are coupled between the adjustable second frame member and the first frame member.

6. The child-carrier mounting adapter of claim 5, wherein the at least one child-supporting device mounting assembly includes two laterally-positioned child-supporting device mounting assemblies, wherein the two frame connectors are laterally positioned, and wherein paired ones of the child-supporting device mounting assemblies and the frame connectors form adapter hubs.

7. The child-carrier mounting adapter of claim 5, further including a position-indicating system including a series of windows formed in the frame connectors or the adjustable second frame member, and a visual indicia positioned on the other of the frame connectors or the adjustable second frame member and visible through each of the windows when aligned therewith to correlate the retracted and extended positions of the adjustable second frame member to the window through which the indicia is visible.

8. The child-carrier mounting adaptor of claim 5, comprising two child-supporting device mounting assemblies, and further comprising two folding systems that enable the respective child-supporting device mounting assemblies to fold relative to the peripheral frame, each of the folding systems including a circumferential keyway and a pin received in the keyway to permit the folding, the keyway formed in the frame connectors or the first frame member, and the pin projecting from the other of the frame connectors or the first frame member.

9. The child-carrier mounting adapter of claim 1, wherein the at least one lock assembly includes a series of catch surfaces and the lock member is movable to engage or release one of the catch surfaces to selectively retain the adjustable second frame member in the retracted or extended position or to release the adjustable second frame member for adjustment.

10. The child-carrier mounting adapter of claim 9, wherein the catch surfaces are defined by serial openings that receive the pivotal tab.

11. The child-carrier mounting adapter of claim 9, further comprising at least one actuator assembly including an actuator and a linkage operably connected between the actuator member and the lock member, wherein actuation of the actuator member moves the lock member to engage or release the catch surfaces.

12. The child-carrier mounting adapter of claim 11, wherein the at least one lock assembly includes two laterally positioned lock assemblies, and wherein the at least one actuator assembly includes one actuator assembly operably connected to the two lock assemblies for simultaneous one-handed operation of both the lock assemblies.

13. The child-carrier mounting adapter of claim 9, wherein the biasing spring that biases the lock member into locking engagement with the catch surfaces comprises a coil compression spring retained between the plunger and an inner flange.

14. The child-carrier mounting adapter of claim 1, further including at least one strap that is selectively positionable looped around handle-hubs of the carrier to restrain the carrier on the adapter.

15. An adapter for mounting a child carrier to a stroller having at least one carrier-mounting assembly, the child carrier having a seat shell, the adapter comprising:
two laterally-positioned stroller-mounting assemblies that are compatible with the at least one carrier-mounting assembly of the stroller so that the adapter removably mounts to the stroller, the stroller-mounting assemblies each including a latch;
a peripheral frame defining a frame opening through which a selected carrier is partially receivable to support the carrier seat shell by the peripheral frame in a nested arrangement, wherein the peripheral frame forms a continuous loop that is generally rectangular in shape, wherein the peripheral frame includes a fixed frame member, an adjustable frame member, and two frame connectors coupled therebetween, and wherein the adjustable frame member telescopically slides forward/rearward relative to the frame connectors between a retracted position and an extended position, with the frame opening defining a first dimension in a forward/rearward direction when the adjustable frame member is in the retracted position, and with the frame opening defining a second dimension longer than the first dimension in the forward/rearward direction when the adjustable frame member is in the extended position;
two laterally-positioned lock assemblies each including a series of catch surfaces, a plunger that retains a lock member that is movable to engage or release one of the catch surfaces to selectively retain the adjustable frame member in the retracted or extended position or to release the adjustable frame member for adjustment and a biasing spring which engages the lock member in an extended lock position; and
at least one actuator assembly including an actuator and a linkage operably connected between the actuator member and the plunger of each lock assembly, wherein actuation of the actuator member compresses the biasing spring and moves the lock member to release the catch surfaces,
wherein when the adjustable frame member is in the retracted position the frame opening partially receives and the peripheral frame supports a carrier with a seat shell defining a first dimension, and wherein when the adjustable frame member is in the extended positioned the frame opening partially receives and the peripheral frame supports a carrier with a seat shell defining a second dimension larger than the first dimension.

16. The child-carrier mounting adapter of claim 15, wherein the adjustable frame member is repositionable relative to the fixed frame member to at least one intermediate position between the retracted and extended positions.

17. The child-carrier mounting adapter of claim 15, wherein each lock member includes a pivotal tab that is pivotally mounted to the adjustable frame member, the catch surfaces are defined by serial openings that receive the pivotal tab, and the actuator member is operably connected to the two lock members for simultaneous one-handed operation of both the lock assemblies.

18. The child-carrier mounting adapter of claim 15, further including a position-indicating system including a series of windows formed in the frame connectors or the adjustable frame member, and a visual indicia positioned on the other of the frame connectors or the adjustable frame member and visible through each of the windows when aligned therewith to correlate the retracted and extended positions of the adjustable frame member to the window through which the indicia is visible.

19. The child-carrier mounting adapter of claim 15, further including at least one strap that is selectively positionable looped around handle-hubs of the carrier to restrain the carrier on the adapter.

20. The child-carrier mounting adaptor of claim 15, further comprising two folding systems that enable the respective stroller-mounting assemblies to fold relative to the peripheral frame, each of the folding systems including a circumferential keyway and a pin received in the keyway to permit the folding, the keyway formed in the frame connectors of the fixed frame member, and the pin projecting from the other of the frame connectors or the fixed frame member.

21. An adapter for mounting a child carrier to a child-supporting device having at least one mounting assembly, the adapter comprising:
at least one child-supporting device mounting assembly that is compatible with the mounting assembly of the child-supporting device so that the adapter removably mounts to the child-supporting device;
a peripheral frame defining a frame opening through which a selected carrier is partially receivable to support the carrier by the peripheral frame in a nested arrangement, wherein the peripheral frame includes a first frame member and an adjustable second frame member adjustably coupled to the first frame member, with the adjustable second frame member repositionable relative to the first frame member between a retracted position and an extended position, with the frame opening defining a first dimension when the adjustable second frame member is in the retracted position, and with the frame opening defining a second dimension larger than the first dimension when the adjustable second frame member is in the extended position;

at least one lock assembly comprising a series of catch surfaces and a plunger that holds a lock member that is movable to engage or release one of the catch surfaces to selectively retain the adjustable second frame member in the retracted or extended position or to release the adjustable second frame member for adjustment, the lock member further comprising a pivotal tab that is pivotally mounted to the adjustable second frame member and wherein the catch surfaces are defined by serial openings that receive the pivotal tab; and at least one actuator assembly comprising an actuator and a linkage operably connected between the actuator member and the plunger of the lock member, wherein actuation of the actuator member moves the lock member to engage or release the catch surfaces, and wherein the at least one lock assembly further comprises two laterally positioned lock assemblies, and wherein the at least one actuator assembly comprises one actuator assembly operably connected to the two lock assemblies for simultaneous one-handed operation of both the lock assemblies;

wherein the actuator assembly includes a rotor that is rotationally mounted to the adjustable frame member such that when the rotor rotates, the linkage pulls the plunger of the lock member;

wherein when the adjustable second frame member is in the retracted position the frame opening partially receives and the peripheral frame supports a first selected carrier, and wherein when the adjustable second frame member is in the extended positioned the frame opening partially receives and the peripheral frame supports a second selected carrier that is larger than the first selected carrier.

* * * * *